March 22, 1966 M. E. FISHER ETAL 3,241,399
TRANSMISSION
Filed Dec. 26, 1962 2 Sheets-Sheet 1
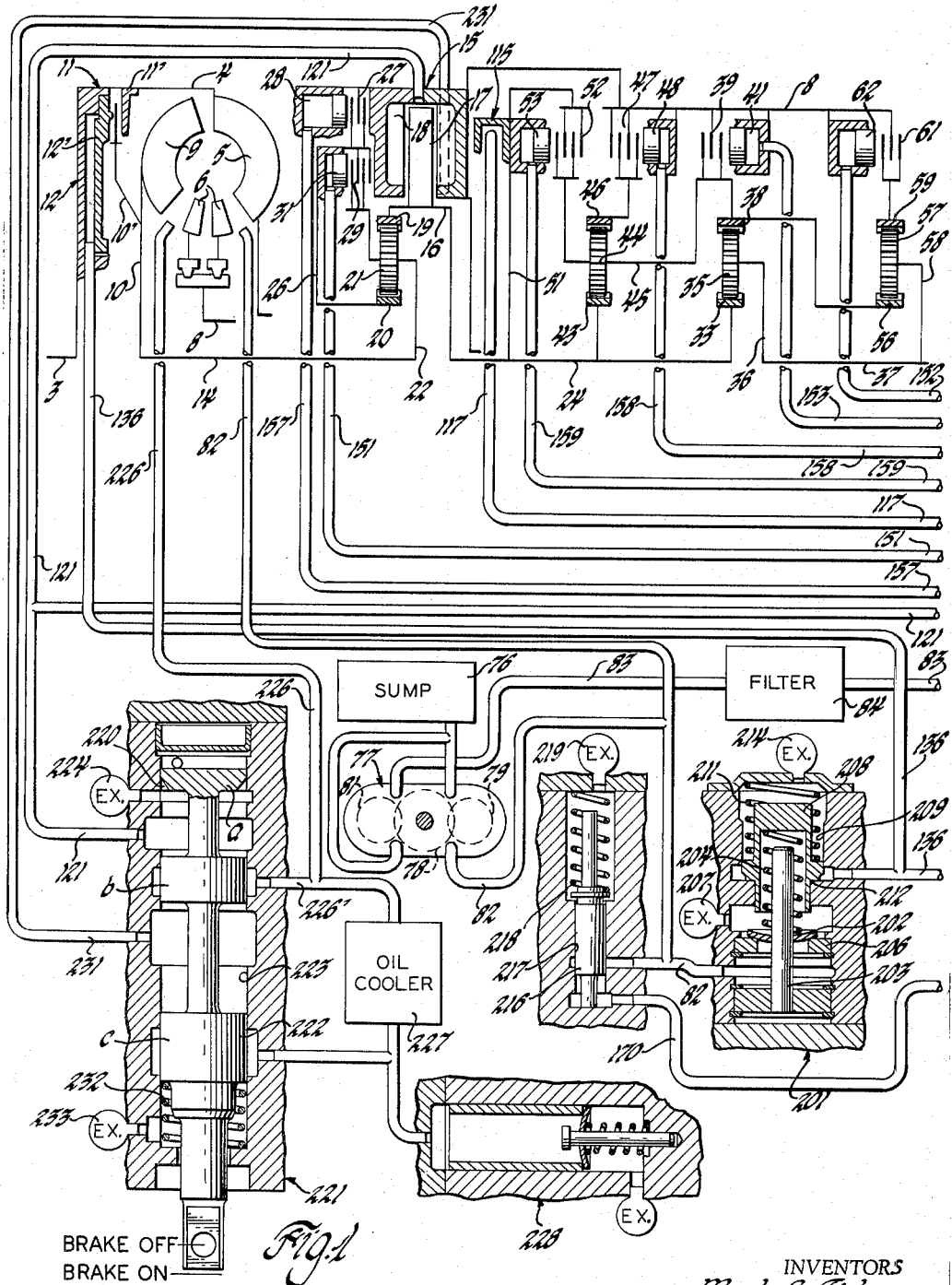
INVENTORS
Mark E. Fisher,
BY Sidney A. Rains, &
James A. Mitchner
A. H. Heiter
ATTORNEY

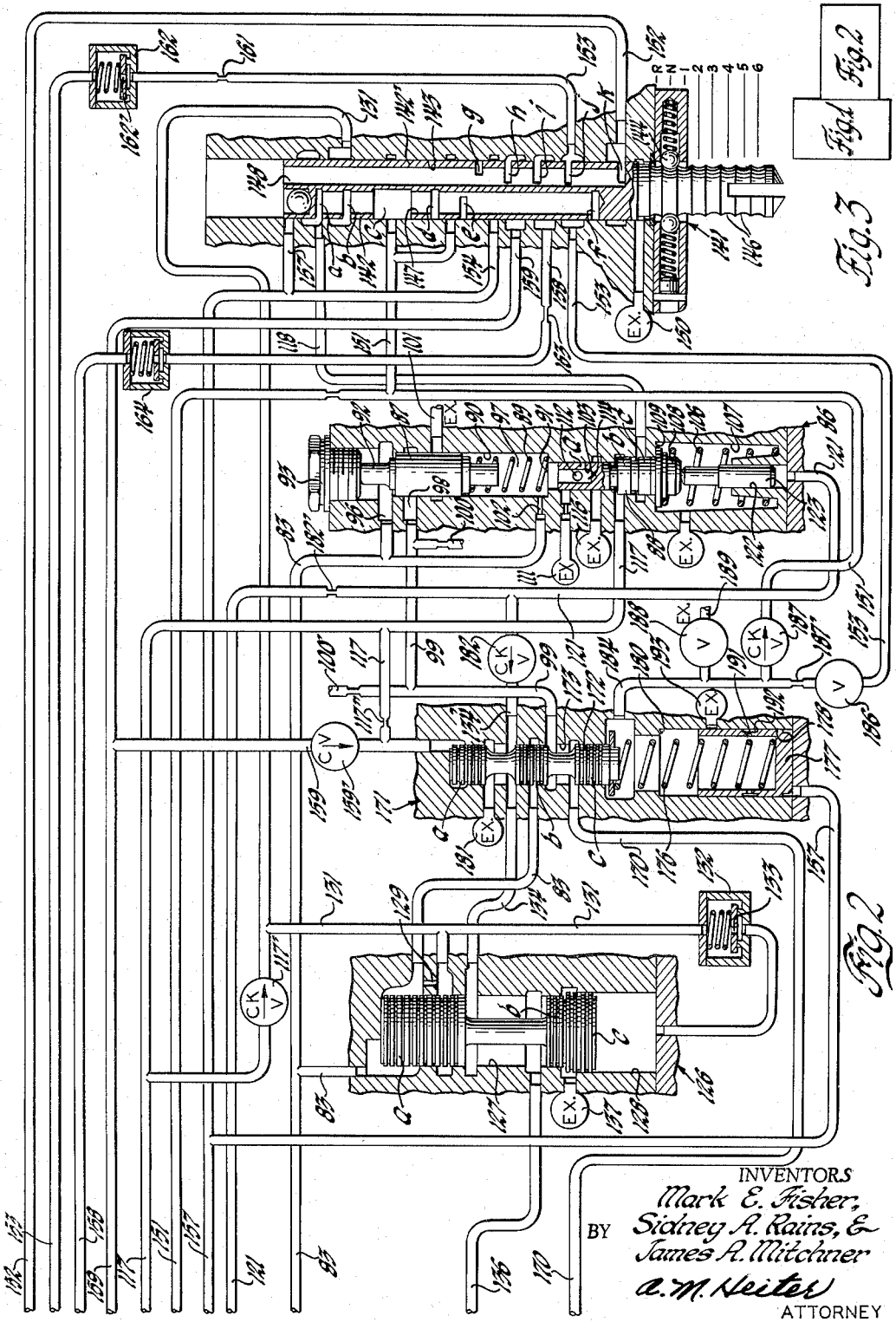

United States Patent Office 3,241,399
Patented Mar. 22, 1966

3,241,399
TRANSMISSION
Mark E. Fisher, Carmel, Sidney A. Rains, Speedway City, and James A. Mitchner, Martinsville, Ind., assignors to General Motors Corporation, Detroit, Mich., a corporation of Delaware
Filed Dec. 26, 1962, Ser. No. 247,149
17 Claims. (Cl. 74—731)

This invention relates to transmissions and particularly to transmission control systems.

The control system is employed in a transmission having a torque converter, a lockup clutch for locking up the torque converter, a hydrodynamic brake and a gear unit having a two speed splitter unit and a three speed and reverse main gear unit. The two speed splitter gear unit provides a low and high drive ratio in each of the forward ratios of the main gear unit to provide six forward speeds. In reverse drive only low speed in the splitter gear is employed to provide one reverse drive. A three gear pump driven by the engine or input to the transmission provides two sources of fluid under pressure. One source is regulated by a piloted main line regulator valve employing a pilot valve to regulate a hydraulic pressure to control the main regulator valve. The pressure provided by the pilot valve is varied in accordance with certain transmission operating functions such as speed, forward and neutral drive, and hydrodynamic brake outlet pressure to vary the main line regulated pressure. The other source of fluid under pressure from the input driven pump is regulated at a low pressure when the lockup clutch is engaged and at a higher pressure when the lockup clutch is disengaged and the converter is operating and connected to supply the torque converter operating chamber. The overage from the main line regulator valve is controlled by the lockup shift valve to provide a connection, when the converter is operating, to the lubrication pressure regulator valve to connect the main line overage to the torque converter operating chamber supply.

An object of the invention is to provide for a transmission having a torque converter and fluid operated drive control devices, a pump providing two sources of pressure with one source being regulated by a main line regulator valve connecting the overage to supply the torque converter operating chamber and a second source regulated by a converter pressure regulator valve and directly connected to the torque converter operating chamber.

Another object of the invention is to provide in a transmission having a torque converter, a lockup clutch and fluid operated drive engaging devices, a control system having a pump providing two sources of fluid under pressure with a main line regulator valve regulating one source for control of the fluid operated drive device and connecting the overage to the torque converter operating chamber and a converter pressure regulator valve regulating the second supply of fluid under pressure at a low pressure when the lockup clutch is engaged and at a higher pressure when the lockup clutch is disengaged.

Another object of the invention is to provide in a transmission control system a piloted regulator valve having a main regulator valve element controlling the main line pressure for operating fluid operated drive devices and a pilot valve controlling a hydraulic pressure employed to control the main regulator valve having means to control the pilot valve responsive to transmission operating conditions, such as speed and drive control position.

Another object of the invention is to provide in a transmission having a torque converter, a lockup clutch, a brake and fluid operated drive means, a control system having a main line pressure regulator valve providing an increase in main line pressure only when the brake is operated and the lockup clutch is engaged.

These and other objects of the invention will be more apparent from the following description and drawings of the preferred embodiment of the invention.

FIGURES 1 and 2 schematically show the transmission and the control system when arranged as indicated in FIGURE 3.

The invention is illustrated in a transmission having an input shaft 3 driving a rotary torque converter housing 4. The torque converter housing encloses the torque converter operating chamber containing fluid and the torque converter rotors, the pump 5, the stator 6, which may be a dual stator, each connected by a one-way brake to the stationary transmission housing 8, and the turbine 9 connected by a hub 10 to the converter or turbine shaft 14. The fluid in the torque converter operating chamber is circulated by the pump 5 through the turbine 9 and redirected by the stator 6 for entry to the pump to provide fluid torque multiplication drive in a conventional manner. The lockup clutch 11 has a fixed driving plate 11' mounted on the housing 4, a driven plate 10' mounted on the hub 10, and a movable piston and pressure plate 12' mounted in a cylinder in the housing 4 and rotating therewith. The piston and cylinder form the lockup clutch motor 12 which, on the supply of fluid to the motor, engages the lockup clutch driven plate between the piston 12' and driving plate 11' to engage the lockup clutch and substitute a direct mechanical drive for the fluid drive of the torque converter. The fluid pressure in the torque converter operating chamber acts to release the lockup clutch and may be assisted by suitable retraction springs, not shown.

The converter or turbine shaft 14 is connected by a two-speed splitter unit providing direct drive or low and overdrive or high to intermediate shaft 24. The splitter gear unit has a ring gear 19 connected by drum 16 to drive the output or intermediate shaft 24 and meshing with the planetary pinions 21 mounted on the carrier 22 which is connected to and driven by the converter shaft 14. The sun gear 20 meshes with the pinions and is controlled to provide the two drives through the control hub 26 which, for high ratio or overdrive, is held stationary by the brake 27 which consists of a plurality of plates attached alternately to the hub 26 and the housing 8 and is engaged by the splitter high or overdrive motor 28. To provide low ratio or direct drive, the control hub 26 is connected by clutch 29 having alternate plates attached to the control hub and the carrier 22 and this clutch is actuated by the splitter low or direct drive motor 31.

The hydrodynamic brake 15 has a rotor 17 mounted on the drum 16 connecting the ring gear 19 to intermediate shaft 24. The rotor 17 consists of a plurality of flat blades located in the brake chamber which has a plurality of stator blades 18 fixed therein and fixed to the stationary housing 8. When the hydrodynamic brake chamber is filled with fluid, rotation of the rotor is resisted to provide braking.

The main gear unit provides low, intermediate, high and reverse drive. The low ratio drive is provided between the intermediate shaft 24 and the output shaft 37 by the low planetary gear set consisting of a plurality of planetary pinions 35 mounted on a carrier 36 connected to the output shaft 37 and meshing with the driving sun gear 33 which is fixed to the intermediate shaft 24 and with the controlled ring gear 38. The ring gear 38 is controlled by a brake 39 consisting of alternate plates attached to the ring gear and the housing 8 which are engaged by the low motor 41 to hold the ring gear for low ratio on the supply of fluid to this motor.

Intermediate ratio in the main gear unit is provided by the intermediate and low gear sets. The intermediate gear set has pinions 44 mounted on a carrier 45 connected to ring gear 38 and the pinions mesh with a larger sun gear 43 driven by the intermediate shaft 24 and the controlled ring gear 46. To provide intermediate ratio, the ring gear 46 is held by the brake 47 consisting of alternate plates attached to the ring gear 46 and the housing and engaged by the intermediate motor 48 to drive the ring gear 38 of the low gear set so the combined gear sets provide an intermediate ratio.

High ratio in the rear or main gear unit is a direct drive provided by locking up this gear unit. The intermediate shaft 24 is connected to the clutch hub 51 and connectible by the clutch 52 to the carrier 45. The high clutch motor 53 is supplied with fluid to engage the high clutch 52 to cause the intermediate shaft 24 and carrier 45 to rotate together to lock up the main gear unit for direct drive or high.

Reverse drive is provided by the reverse gear set which has a plurality of pinions 57 rotatably mounted on a carrier 58 connected to drive the output shaft 37. The pinions mesh with a sun gear 56 connected to rotate with the ring gear 38 and mesh with the ring gear 59. The brake 61 for controlling the ring gear 59 consists of plates connected to the ring gear and the housing 8 and is actuated by the reverse fluid motor 62 to hold the ring gear to provide reverse drive in the main gear unit.

In the splitter gear unit, either the splitter low motor or the splitter high motor are supplied with fluid to selectively provide either low (direct) or high ratio (overdrive) in the splitter gear unit, and the other motor is connected to exhaust. In the main gear unit, fluid is selectively supplied to one of the low, intermediate, high and reverse motors and the others are exhausted to provide the selected one of low, intermediate, high and reverse drives. The controls permit engagement of reverse ratio of the main gear unit with only the low ratio of the splitter unit to provide one reverse drive. When the main unit is in low, the splitter gear unit may be engaged in low or high and respectively provide first and second forward drive ratio. Similarly, with intermediate ratio engaged in the main unit, low and high in the splitter unit provides third and fourth ratios. With high in main unit, splitter low and splitter high provides fifth and sixth ratios. Each of the fluid actuated ratio engaging friction devices consisting of a motor for actuating a ratio engaging clutch and brake is provided with suitable retraction springs, not shown, to disengage each clutch and brake on exhausting the control line. The clutches and brakes are engaged by supplying fluid via the control lines to the motors for selectively engaging each of the brakes and clutches or fluid operated drive engaging devices.

CONTROL SYSTEM

Regulator valve

The fluid which exhausts from the various exhaust ports EX, the lubrication system and other leakage collects in the sump 76 located in the lower portion of the stationary transmission housing 8. Fluid is supplied to the control system by an input driven pump driven by the shaft 3 or housing 4. The pump 77 has a central gear 78 and side gears 79 and 81. The gears 78 and 79 comprise one pump unit supply fluid under pressure from the sump 76 to the converter supply line 82 while the gears 78–81 comprise a second pump unit supplying fluid under pressure to the main line 83. The main line is connected through filter 84 to the piloted pressure regulator valve 86 which has a main regulator valve element 87 and a pilot valve element 88. The main regulator valve element 87 is reciprocally mounted in a bore 90 and is biased by a tickler spring 89 resting on the shoulder 91 at the end of the bore to bias the valve element to the closed position shown in which the stem 92 on the end of the valve element abuts the plug 93 which seals the end of the bore 90. The main line 83 is connected to the port 96 and acts on the end of the valve element to move the valve against the spring 89 and the regulating or biasing fluid in the chamber portion 97 of the bore. When the pressure increases above the regulated valve, valve 87 is moved against the biasing force and the normal overage is connected via port 98 to the overage or lubricating line 99. Excess overage, particularly due to cold oil, is connected to exhaust 101.

The main line 83 is also connected by an orifice 102 to the chamber 97 where the biasing pressure is regulated by the pilot valve element 88, having lands $a$, $b$ and $c$ of increasing diameter located in a similarly stepped bore 103. A spring 106 abutting the end of the spring chamber 107 in the valve body engages an enlarged shoulder 108 on the land $c$ end of pilot valve 88 and normally biases the pilot valve until the shoulder 108 engages the shoulder 109 on the valve body to locate the valve in the closed position shown. The fluid pressure supplied by main line and orifice 102 to the chamber 97 acts on the end of land $a$ and moves the valve in the opposite direction. Excess pressure of the regulating fluid will move the pilot valve element 88 against the biasing force, first to connect the chamber 97 to exhaust orifice 111. Then with a few thousandths additional movement, the passage 112 from the central bore 114 in land $a$ is connected to exhaust 116 to provide a combined exhaust which increases with increasing movement to limit the degree of movement of the pilot valve so that this valve operates under substantially the same spring biasing force.

The Pitot governor line 117 supplied with pressure proportional to the speed of the intermediate shaft by a conventional Pitot governor 115 and limited to pressures equal to main line pressure by check valve 117′ which, when governor pressure exceeds main line pressure, connects line 117 to line 131, is connected to the valve bore between the lands $a$ and $b$ to act on the unbalanced area of land $b$ to reduce the pressure regulated by the pilot valve in chamber 97 and the main line pressure regulated by the main regulator valve in line 83 with increasing governor pressure and increasing transmission speed. The forward and neutral knockdown or signal line 118 is connected between the lands $b$ and $c$ to act on the unbalanced area of land $c$ to reduce the main line pressure in all forward drives and neutral. The brake outlet pressure supplied via line 121 which is proportional to the torque provided by a hydrodynamic brake, since this line is connected in a tangential manner at the outer perimeter of the brake operating chamber, is connected to a bore 122 in the valve body and acts on a plug 123 which engages the pilot valve 88 to increase the regulated pressure with increasing brake outlet pressure or brake torque.

Flow valve

Main line 83 is also connected to the flow valve 126 which has lands $a$ and $b$ of equal diameter and $c$ of a larger diameter. The lands $a$ and $b$ are located in the bore 127 and the land $c$ in the larger bore 128. Main line 83 is connected to act on the end of land $a$ and through an orifice 129 to the ratio supply line 131 which is connected via the orifice check valve 132 to permit slow flow through the orifice 133 to the bore 128 to act on the land $c$. Since land $c$ is larger than the land $a$ during periods of equilibrium of the fluid pressure at opposite ends of the valve, the valve will be in the position shown connecting the lockup supply line 134 to the lockup clutch line 136 to supply fluid to the lockup clutch motor 12 to engage the lockup clutch. Whenever a ratio is being engaged, fluid flow from main line 83 through the orifice 129 to the ratio supply line 131 will reduce the pressure in line 131 and the bore 128.

acting on the land c and permit the higher pressure acting on land a to shift the valve to block lockup supply line 134 and connect the lockup clutch line 136 to exhaust 137.

Manual selector valve

The manual selector valve 141 has a valve element 142 located in a bore 143 and axially movable to positions defined by the spring loaded ball detent mechanism 144 and the annular grooves 146 in the valve element 142. These positions are reverse, neutral and first through sixth ratios, as indicated on the drawing by R, N and 1, 2, 3, 4, 5 and 6. The valve element has a supply bore 147 having ports a, b, c, d, e and f and an exhaust bore 148 opens at one end of the valve and having ports g, h, i, j and k. In the neutral position shown, the ratio supply line 131, supplied by main line 83, is connected via port b, the supply bore 147 and port c to the direct drive clutch line 151. The forward and neutral signal line 118 is supplied from the main line, supply line 131 and bore 147 in neutral and first by port a, in second and third by part d and in fourth, fifth and sixth by port c. All other ratio lines are connected to exhaust. In reverse, the ratio supply line is connected by port a to supply bore 147 and by ports c and d to direct drive line 151 and by port f to reverse line 152. The other lines are connected by the exhaust port to the exhaust bore 148. In first, bore 147 is connected by ports c and e to direct drive line 151 and by port f to low line 153. In second, port a is connected to the overdrive line 157 and port f to the low line 153. In third, port d is connected to the direct drive line 151 and port f to the intermediate line 158. In fourth, port b is connected to the overdrive line 157 and port f to the intermediate line 158. In fifth, port e is connected to direct drive line 151 and port f to the high line 159. In sixth, port c is connected to the overdrive line 157 and port f to the high line 159. In each of these drives the other lines are connected to exhaust bore 148 via the exhaust ports g through j or exhaust 150.

In the low line connection from the manual selector valve to the low motor, there is a large orifice 161 and a check valve 162 having a smaller orifice 162' in the plate providing high orifice flow to the motor and a slower return flow. In the intermediate line there is a similar orifice 163 and check valve 164.

Lockup valve

The lockup valve 171 has a valve element 172 having lands a and b of equal diameter and a larger land c located in a stepped bore 173. The governor line 117 is connected to the smaller end of the bore to act on the end area of land a to urge the valve from the downshift position to the upshift position. A spring 176 abuts the other end of the valve and urges the valve toward the downshift position. The spring is seated in a cup piston abutment 177 located in a bore 178. With the valve in the downshift position shown, there is an exhaust 181 between the lands a and b adjacent land a and the lockup line 134 is connected between these same lands adjacent land b and thus to exhaust 181. The lockup line is connected by branch 134' to a check valve 182 which functions to provide an exhaust from the brake outlet line 121 when the lockup valve is in the downshift position for converter drive. In the downshift position of the lockup valve, the main line 83 is blocked by land b and the lube line 99 is connected between the land b and c to lockup controlled lubrication line 170 and the low pressure regulator valve 216.

A signal line 184 is connected to the bore 178 between the abutment 177 and the valve element 172 and will prevent lockup whenever fluid is supplied to line 184. The low line 153 has a manual on-off valve 186, such as a stop cock or removable plug and an orifice 187' in the connection to the signal line 184. The direct drive line 151 has a check valve 187 preventing flow from direct line 151 to the signal line 184 but permitting flow from the signal line 184 and line 153 to direct line 151 when it is connected to exhaust. Signal line 184 has a manual on-off valve 188 which in the on position connects the line 184 to exhaust 189. The variable abutment piston 177 has an aperture 191 leading to an annular groove 192 which in the uppermost position of the piston 177 connects with the exhaust 193.

When the governor pressure overcomes the normal biasing force of the spring 176, the lockup valve element 172 upshifts blocking exhaust 181 and connecting the main line 83 to the lockup feed line 134 which, if the flow valve 126 is in the open position shown, is connected to the lockup clutch line 136 to engage the lockup clutch. Also, on an upshift the lubrication line 99 is disconnected from the lockup controlled lubrication line 170. When the transmission is shifted from direct drive to overdrive, the overdrive line 157 is pressurized which lifts the piston 177 upwardly contacting the shoulder 180 to increase the biasing force so that the upshift occurs at a higher speed of the intermediate shaft but at the same turbine shaft speed. To insure that there is no pressure in the bore 178 between the valve element and piston 177, the port 191 and annular groove 192 is in line with the exhaust 193 to exhaust the space between these valves.

For lockup in all gear ratios, the valve 188 is opened to connect signal line 184 to exhaust 189 and the valve 186 is closed to block low line 153. To provide lockup in all drives except first drive, the valve 186 is opened and the valve 188 closed. Then whenever transmission is in first, fluid will be supplied to line 184 since fluid is supplied by low line 153 to line 184 and the exhaust via check valve 187 in first drive is blocked by fluid pressure in direct drive line 151. Since in second speed there is no pressure in direct drive line 151, the pressure supplied via low line 153, in limited volume through orifice 187, will exhaust via check valve 187 and direct drive line 151 at the manual valve. This pressure is also connected to exhaust 193. Thus there will be lockup in second drive. In all other ratios, 3 through 6, and since line 153 is connected to exhaust, lockup is permitted. The high line 159 may be connected by check valve 159' permitting flow only to governor line 117 to provide lockup at all times in fifth and sixth ratios. Orifice 117" prevents this line pressure from changing governor pressure in line 117 to the regulator valve 86.

Converter pressure regulator valve

The converter pressure supply line 82 is regulated by the converter pressure regulator valve 201 which has an annular valve element 202 guided on a fixed stem 203 and biased by a spring 204 into engagement with the seat 206. The converter pressure connected by line 82 acts on the valve element 201 and lifts it off the seat at the regulated pressure to exhaust the excess fluid to exhaust 207. The spring 204 engages a movable abutment 208 slidably mounted in a bore 209 and normally retained by the heavy spring 211 in the lower position shown so that the converter pressure regulator valve regulates at a high pressure, i.e., 100 p.s.i. The lockup clutch line 136 is connected to the bore 209 to act on the underside of an unbalanced area 212 on the movable abutment 208 so that when the lockup clutch is engaged, fluid pressure lifts the movable abutment to reduce the biasing force exerted by spring 204 to regulate converter pressure when the lockup clutch is engaged at a low pressure, i.e., 35 p.s.i. The exhaust 214 vents bore 209 behind abutment 208. The lube pressure regulator valve regulates the lubrication line pressure when the converter is operating and if the pressure exceeds a high pressure, i.e., 100 p.s.i., the valve element 216 located in the bore 217 is moved upwardly against the biasing force of the spring 218 to connect the lockup controlled lubricating line to the converter line and thus supply main line overage to converter supply during converter operation. The exhaust 219 vents the spring chamber of this valve.

*Hydrualic retarder control valve*

The hydraulic retarder, or hydrodynamic brake, is controlled by a brake control valve 221 which has a valve element 222 having lands *a*, *b* and *c* of equal diameter located in a bore 223. In the brake off position shown, the brake outlet line 121 is connected between the lands *a* and *b* to the exhaust 224. The converter outlet line 226 is blocked by the land *b* so that oil flows through the cooler 227 and is blocked by the land *c* for flow to the converter pressure regulator valve 228 which regulates the outlet pressure of the converter at a low value. The brake feed line 231 is blocked between the lands *b* and *c*. Spring 232 normally biases the valve to retarder off position. The spring chamber is vented by exhaust 233. When the valve is moved to the retarder on position, the exhaust 224 is gradually closed, since land *a* has tapered slot 220 and the retarder outlet line 121 is connected between land *a* and *b* to the converter outlet branch 226' where it joins the converter out flow through the oil cooler 227, and then flows between the lands *b* and *c* to the brake feed line 231 to supply fluid to the brake in a volume varying with valve position.

OPERATION

When the engine is started, the portion comprising gears 78–79 of the three gear pump 77 supplies fluid via line 82 to the torque converter which is regulated at a low pressure when the lockup clutch is engaged and a high pressure when the lockup clutch is disengaged for converter operation by the converted pressure regulator valve 201. Fluid is also supplied by the gears 78–81 of the three gear pump 77 to the main line 83 and is regulated at main line pressure by the piloted main regulator valve 86. This valve is of the pilot type with main line pressure at one end of the main regulator valve elements 87, and the pilot valve regulated pressure in the chamber 97 operating at the other end of the valve provides the biasing pressure or force to regulate the main line pressure. The spring 89 is merely a light tickler spring to insure that valve 87 is in the closed position whenever there is no hydraulic pressure on either side and thus the rate of this spring has no significant effect on the operation of this valve. A reduced supply of fluid from the main line is conveyed via orifice 102 to the regulating chamber 97 and regulated by the pilot valve to provide the control pressure for the main regulator valve element 87. The pilot valve element 88 is biased by a spring 106 to provide the normal pressure. Due to the small area of the pilot valve element 88, the small flow through orifice 102 between line 83 and chamber 97, because of the low constant pressure drop established by spring 89, and the rapid increase in the size of the total exhaust opening in response to a small degree of movement as the second exhaust 116 is opened providing a total exhaust opening at a stepped or abruptly increasing rate during constant rate valve movement, the change in biasing force of spring 106, due to the spring rate in the degree of movement required, a few thousandths of an inch (.003–.005), is very small or insignificant and the regulation of the pilot valve regulated pressure in chamber 97 is very accurate. This biasing pressure is reduced with increasing governor pressure or speed due to the action of the governor pressure on land *b*. Main line pressure is supplied by the forward and neutral line 118 to land *c*, to reduce the main line pressure in all drives except reverse. The piston 123 actuated by brake out pressure provides an increase in main line pressure when the brake is on and the lockup clutch is engaged. The lockup clutch pressure will be applied to the back side of check valve 182 preventing escape of brake out pressure from line 121 via the lockup line 134 to exhaust 181, so brake pressure is only supplied to piston 123 when the lockup clutch is engaged. In converter drive, the brake out pressure in line 121 does not act to increase main line pressure since the brake out pressure will flow as limited by orifice 182' through the check valve 182, line 134 to exhaust 181. The main line, when above regulated pressure, is connected by main regulator valve element 87 to the lubrication line so that main line overage is employed to lubricate the transmissions. One branch 100 is connected through an orifice to lubricate the rear portion of the transmission. Another branch 100' is also connected through an orifice to lubricate the main body of the transmission. During converter drive the overage oil is connected via the lubrication line 99 to the lockup valve and the lockup valve controlled line 170 which connects the overage when it exceeds the normal converter pressure, 100 p.s.i., via the low pressure regulator valve 216 to supply main line overage to the converter supply line 82.

As pointed out above, the manual selector valve 121 is movable from neutral, where it supplies fluid only to the direct line 151 and the forward neutral signal line 118, to first, second, third, fourth, fifth and sixth and reverse positions to connect the ratio supply line to engage the drives, as indicated in the following chart to provide six forward drives and reverse.

| | Splitter Gear Unit | | Main Gear Unit | | | |
|---|---|---|---|---|---|---|
| | Direct Drive (Low) Line 151 Motor 31 | Over-drive (High) Line 157 Motor 28 | Low Line 153 Motor 41 | Int. Line 158 Motor 48 | High Line 159 Motor 53 | Rev. Line 152 Motor 62 |
| N | X | | | | | |
| 1 | X | | X | | | |
| 2 | | X | X | | | |
| 3 | X | | | X | | |
| 4 | | X | | X | | |
| 5 | X | | | | X | |
| 6 | | X | | | X | |
| R | X | | | | | X |

The flow of fluid from the main line 83 to the ratio supply line 131 for the engagement of each of the drive ratios in the gearing actuates the flow valve 126 to shift the valve to block the connection between lockup supply line 134 and connect the lockup clutch line 136 to exhaust 137 to disengage the lockup clutch and return the transmission to converter drive operation to soften the shift.

The lockup shift valve upshifts at the same speed of the turbine output shaft because the overdrive pressure is employed to act on the abutment member 177 to increase the biasing force of the spring when the splitter gear unit is in overdrive which provides a correspondingly higher governor pressure proportional to turbine shaft speed.

Signal lines are also employed to control the lockup shift valve to selectively provide lockup in first gear and to provide lockup in all other drives at all times. This is done by closing valve 188 and opening valve 186 so that low pressure via line 153 is connected to the low end of valve bore 173 to block the lockup valve 171 in the downshift position. In low or first gear this pressure is maintained since the direct pressure in line 151 holds check valve 187 closed. In second ratio, direct line 151 is connected to exhaust permitting line 153 to exhaust via check valve 187 and line 151 thus permitting lockup. In other ratios, pressure is not supplied to the low line 153, thus lockup is obtained.

If it is desired to obtain lockup in all gear ratios, the valve 188 is opened so that fluid from line 184 will drain to exhaust 189 and valve 186 is closed to block line 153 and permit operation of the lockup shift valve. To further prevent entrapment of fluid preventing an upshift of the lockup valve 151, particularly in overdrive, the abutment 177 is provided with a connection 191, 192, 193 to provide an exhaust in this position.

The above described preferred embodiment is illustrative of the invention which may be modified within the scope of the appended claims.

We claim:

1. In a transmission; an input member; an intermediate member; an output member; a torque converter and a clutch having fluid operated clutch means operative for engagement and disengagement connecting two of said members, a multiratio gear unit having a plurality of fluid operated drive means engageable in pairs to provide a plurality of ratio drives connected between another two of said members; source means providing a source of fluid at a regulated pressure; governor means providing a pressure proportional to the speed of one of said members; clutch control means selectively connecting said source means to said fluid operated clutch means to engage said clutch in response to a predetermined speed; drive control means selectively controlling the connection of said source means to condition selected pairs of said fluid operated drive means to provide each of a plurality operatively connected to a selected pair of said fluid operated means to and said clutch control means operative in response to the change of pressure of the fluid in both said last-mentioned selected pair of said fluid operated means, said clutch control means to prevent engagement of said clutch only in some ratio drives but not in other ratio drives.

2. The invention defined in claim 1, said overcontrol means being operative on the connection of said source by said drive control means to a selected pair of fluid operated drive means and including connecting means connecting one of said pair to said clutch control means and said connecting means having exhaust means blocked by the other of said pair.

3. In a transmission; an input member; an output member; a torque converter having a fluid operating chamber and drive establishing means having fluid operated means to establish a drive connected in series between said input and output members; means providing a first and a second source of fluid under pressure; regulator valve means connected to said first source having an overage line, and regulating the pressure of said first source and connecting excess fluid to said overage line; a converter pressure regulator valve regulating the pressure of said second source; said second source being connected to supply said converter operating chamber; and means connecting said regulator valve overage line when above a predetermined pressure to said second source.

4. The invention defined in claim 3 and pilot regulator valve means having biasing means and regulating a biasing pressure and supplying said biasing pressure to said regulator valve means to control said regulator valve means and control means responsive to a condition of transmission operation to change the biasing force provided by said biasing means of said pilot regulator valve means.

5. In a transmission; an input member; an output member; a torque converter having a fluid operating chamber and drive establishing means having fluid operated means to establish a drive connected in series between said input and output members; a three gear pump driven by said input member having a first and a second output; piloted pressure regulator valve means connected to said first pump output having main regulator valve means, pilot regulator valve means, and an overage line; said main regulating valve means connected to said first pump output and regulating the pressure of said first pump output and connecting excess fluid to said overage line; said pilot regulating valve means connected to said first pump outlet and regulating a biasing pressure and supplying said biasing pressure to act on said main regulator valve means to control the pressure regulated by said main regulator valve means; means responsive to a condition of transmission operation acting on said pilot regulator valve means to vary said biasing pressure regulated by said regulating valve element in accordance with changes in said transmission operating condition; a converter pressure regulator valve regulating the pressure of said second pump outlet; said second pump outlet being connected to supply said converter operating chamber; and means connecting said regulator valve overage line when above a predetermined pressure to said second pump outlet.

6. In a transmission; an input member; an output member; drive establishing means having fluid operated means to establish the drive connecting said input and output members and hydrodynamic brake means providing an outlet pressure proportional to brake torque; a source of fluid under pressure; piloted pressure regulator valve means connected to said source having main regulator valve means and pilot regulator valve means; said main regulating valve means connected to said first source and regulating the pressure of said source; said pilot regulating valve means connected to said source and regulating a biasing pressure and supplying said biasing pressure to act on said main regulator valve means to control the pressure regulated by said main regulator valve means; and means responsive to a condition of transmission operation and brake outlet pressure acting on said pilot regulator valve means to vary said biasing pressure regulated by said regulating valve element in accordance with changes in said transmission and brake operating condition.

7. In a transmission; an input member; an output member; a torque converter having a fluid operating chamber and drive establishing means having fluid operated means to establish the drive connected in series between said input and output members and hydrodynamic brake means providing an outlet pressure proportional to brake torque; means providing a first and a second source of fluid under pressure; piloted pressure regulator valve means connected to said first source having main regulator valve means, pilot regulator valve means, an overage line; said main regulating valve means connected to said first source and regulating the pressure of said first source and connecting excess fluid to said overage line; said pilot regulating valve means connected to said first source and regulating a biasing pressure and supplying said biasing pressure to act on said main regulator valve means to control the pressure regulated by said main regulator valve means; means responsive to a condition of transmission operation and brake outlet pressure acting on said pilot regulator valve means to vary said biasing pressure regulated by said regulating valve element in accordance with changes in said transmission and brake operating condition; a converter pressure regulator valve regulating the pressure of said second source; said second source being connected to supply said converter operating chamber; means connecting said regulator valve overage line when above a predetermined pressure to said second pump outlet; and control means connecting said converter fluid operating chamber to said brake to supply fluid to said brake.

8. In a transmission; an input member; an intermediate member and an output member; a torque converter having an operating chamber connecting said input and intermediate members; a lockup clutch having fluid operated clutching means for engaging said lockup clutch connecting said input and intermediate members; a multiratio gear unit connecting said intermediate and output members having fluid operated drive means for selectively establishing each ratio drive; a three gear pump driven by said input member having a first pump output and a second pump output; a pressure regulator valve having a regulator valve element and an overage line connected to said first pump output and biased in one direction for movement to connect said main line to an overage line and having a pilot valve element regulating a restricted flow of main line pressure to provide a regulated biasing pressure biasing said regulator valve element in the opposite direction, said pilot valve element being biased in one direction by said regulated pressure and with movement providing an increasing exhaust of the regulated pressure and being biased in the opposite direction by a spring; governor means providing a governor pressure proportional to speed; lockup shift valve means biased in one direction toward an upshift position by said governor pressure and biased in the opposite direction by biasing means; said lockup valve means connecting said fluid operated clutching means to exhaust in the downshift position and connecting said first pump output to said fluid operating clutching means in said upshift position; selector valve means operatively movable to a plurality of positions for selectively connecting said first pump output to said fluid operated drive means for selectively providing a plurality of ratio drives; means for connecting pressure from said main line and said selector valve for providing a biasing force on said pilot valve to control the first pump output pressure in accordance with the position of said selector valve; a regulator valve regulating the second pump output at a lower pressure; said second pump output means connected to said converter operating chamber; means connecting said main regulator valve overage line to said second pump output when the pressure exceeds a predetermined value; and means blocking said overage line when said lockup shift valve is in an upshift position.

9. In a transmission; an input member; an intermediate member and an output member; a torque converter having an operating chamber connecting said input and intermediate members; a lockup clutch having fluid operated clutching means for engaging said lockup clutch connecting said input and intermediate members; a muliratio gear unit connecting said intermediate and output members having fluid operated drive means for selectively establishing each ratio drive; a first and a second source of fluid under pressure, an overage line, first pressure regulator valve means connected to said first source to regulate the pressure at a high value and to connect excess fluid to said overage line; governor means providing a governor pressure proportional to speed; lockup shift valve means biased in one direction toward an upshift position by said governor pressure and biased in the opposite direction by biasing means; said lockup valve means connecting said fluid operated clutching means to exhaust in the downshift position and connecting said first source to said fluid operating clutching means in said upshift position; selector valve means operatively movable to a plurality of positions for selectively connecting said first source to said fluid operated drive means for selectively providing a plurality of ratio drives and for connecting said first source to said first regulator valve means to control the regulated pressure of said first source in accordance with the position of said selector valve; a second regulator valve regulating said second source at a lower pressure; said second source being connected to said converter operating chamber; means connecting said overage line to said second source when the pressure equals said lower pressure; and means blocking said overage line when said lockup shift valve is in an upshift position.

10. In a transmission; an input member; an intermediate member and an output member; a torque converter having an operating chamber connecting said input and intermediate members; a lockup clutch having fluid operated clutching means for engaging said lockup clutch connecting said input and intermediate members; a multiratio gear unit connecting said intermediate and output members having fluid operated drive means for selectively establishing each ratio drive; a source of fluid under pressure, pressure regulator valve means connected to said source to regulate the pressure at a high value; governor means providing a governor pressure proportional to speed; lockup shift valve means biased in one direction toward an upshift position by said governor pressure and biased in the opposite direction by biasing means; said lockup valve means connecting said fluid operated clutching means to exhaust in the downshift position and connecting said first source to said fluid operating clutching means in said upshift position; selector valve means operatively movable to a plurality of positions for selectively connecting said first source to said fluid operated drive means for selectively providing a plurality of ratio drives; and means connected to said selector valve means and said lockup valve means selectively operable to provide lockup in one of the ratios provided by said selector valve means.

11. In a transmission; a drive member; a driven member; a clutch connecting said drive and driven members having biasing means and fluid operated means selectively operable to engage and disengage said clutch; brake means connected to one of said members including brake control means having a brake on and a brake off position; a source of fluid under pressure having regulator means regulating the pressure of said source at a normal value; control means connecting said brake means and said regulator means to increase the normal regulated pressure when said brake means is in brake on position; means connecting said source to said fluid operated means to engage and disengage said clutch and operative in clutch disengaged position to disable said control means to prevent operation to increase said normal regulated pressure.

12. In a pressure regulator valve, valve means including a valve element movably mounted in a bore having a regulated pressure port and an exhaust port, means connecting the main regulated pressure to act on said valve element in all positions to move said valve element from a closed position to an exhaust position connecting said regulated pressure to said exhaust port, means connecting a pilot biasing pressure to act on said valve element to bias the valve in the opposite direction, pilot regulator valve means to regulate the pilot biasing pressure including a stationary housing having a bore with an inlet passage connected to said pilot biasing pressure and exhaust passage means and a pilot valve assembly movable in said bore for regulating said pilot biasing pressure, said pilot valve assembly having an unbalanced area acted on by said biasing pressure to move said pilot valve assembly to open said exhaust passage means, spring biasing means biasing said pilot valve assembly to closed position with a substantially constant force and said exhaust passage means first opening a restricted opening and with additional movement quickly fully opening an unrestricted exhaust for providing an exhaust which has an abrupt change in flow rate during constant rate movement of said pilot valve assembly so that said spring biasing means functions substantially without change in biasing force.

13. In a transmission; an input member; an intermediate member; an output member; a torque converter and a clutch having fluid operated clutch means operative for engagement and disengagement connecting two of said members, a multiratio gear unit having a fluid operated drive means engageable to provide a ratio drive connected between another two of said members; source means providing a source of fluid under pressure including regulating means providing a fluid supply at a regulated pressure; clutch control means selectively operable for selectively connecting said source to said fluid operated clutch means to engage said clutch; drive control means selectively connecting said source to said fluid operated drive means to provide said ratio drive; brake means operatively connected to one member and including brake control means having a brake on and a brake off position;

means operatively connecting said brake to said clutch control means and said source means operative for increasing said regulated pressure only when said clutch control means is selectively engaging said clutch.

14. In a transmission; an input member; an output member; drive establishing means having fluid operated means to establish the drive connecting said input and output members; a source of fluid under pressure; piloted pressure regulator valve means connected to said source having main regulator valve means and pilot regulator valve means; said main regulating valve means connected to said source and regulating the pressure of said source; said pilot regulating valve means connected to said source and regulating a biasing pressure and supplying said biasing pressure to act on said main regulator valve means to control the pressure regulated by said main regulator valve means; and means responsive to a condition of transmission operation acting on said pilot regulator valve means to vary said biasing pressure regulated by said regulating valve element in accordance with changes in said transmission operating condition.

15. In a transmission; an input member; an intermediate member; an output member; a torque converter and a clutch having fluid operated clutch means operative for engagement and disengagement connecting two of said members, a multiratio gear unit having a plurality of fluid operated drive means engageable in pairs to provide a plurality of ratio drives connected between another two of said members; source means providing a source of fluid at a regulated pressure; governor means providing a pressure proportional to the speed of one of said members; clutch control means selectively connecting said source means to said fluid operated clutch means to engage said clutch in response to a predetermined speed; drive control means selectively controlling the connection of said source means to condition selected pairs of said fluid operated drive means to provide a plurality of ratio drives; overcontrol means connecting said drive control means to said clutch control means to prevent engagement of said clutch only in some ratio drives but not in other ratio drives, said overcontrol means including means to selectively disable said overcontrol means.

16. In a transmission; an input member; an intermediate member; an output member; a torque converter and a clutch having fluid operated clutch means operative for engagement and disengagement connecting two of said members; a multiratio gear unit having a plurality of fluid operated drive means engageable in pairs to provide a plurality of ratio drives connected between another two of said member; source means providing a source of fluid under pressure including regulating means providing a fluid supply at a regulated pressure; governor means providing a pressure proportional to the speed of one of said member; clutch control means selectively connecting source means to said fluid operated clutch means to engage said clutch in response to a predetermined speed; drive control means selectively controlling the connection of said regulated fluid pressure from said source means to condition selected pairs of said fluid operated drive means to provide a plurality of ratio drives; overcontrol means connecting said drive control means to said clutch control means to prevent engagement of said clutch only in some ratio drives but not in other ratio drives, brake means operatively connected to one member and including brake control means having a brake on and a brake off position; means operatively connecting said brake to said clutch control means and said regulating means of said source means operative for increasing said regulated pressure, only when said clutch control means is selectively engaging said clutch and said brake is in said brake on position.

17. In a transmission; a drive member; a driven member; a torque converter having a fluid operating chamber connecting said drive and driven members; a clutch connecting said drive and driven members having biasing means and fluid operated means selectively operable to engage and disengage said clutch; brake means connected to one of said members including brake control means having a brake on and a brake off position; source means for providing a source of fluid under pressure including regulator means providing a supply of fluid under pressure pressure from said source at a normal regulated value; means connecting said source means to said fluid operating chamber; control means connecting said brake means and said regulator means to increase the normal regulated pressure when said brake means is in brake on position; means connecting said regulated pressure of said source means to said fluid operated means to engage and disengage said clutch and operative in clutch disengaged position to disable said control means to prevent operation to increase said normal regulated pressure.

References Cited by the Examiner

UNITED STATES PATENTS

| | | | |
|---|---|---|---|
| 934,083 | 9/1909 | Mills | 137—491 |
| 2,360,816 | 10/1944 | Pasco | 137—489 |
| 2,661,763 | 12/1953 | Renick | 137—489 |
| 2,781,049 | 2/1957 | Binford | 137—489 X |
| 2,893,267 | 7/1959 | Forster. | |
| 2,905,190 | 9/1959 | Oyster. | |
| 2,978,928 | 4/1961 | Tuck et al. | |
| 3,053,116 | 9/1962 | Christenson et al. | |
| 3,101,011 | 8/1963 | Fisher et al. | |
| 3,101,738 | 8/1963 | Horlacher | 137—489 |
| 3,125,319 | 3/1964 | Arboyast et al. | 137—489 X |

DON A. WAITE, *Primary Examiner.*